United States Patent
Shimodaira et al.

[11] Patent Number: 6,038,123
[45] Date of Patent: Mar. 14, 2000

[54] ELECTRIC DOUBLE LAYER CAPACITOR, AND CARBON MATERIAL AND ELECTRODE THEREFOR

[75] Inventors: Noriaki Shimodaira; Takeshi Kawasato; Kazuya Hiratsuka; Manabu Suhara; Manabu Tsushima, all of Yokohama, Japan

[73] Assignee: Asahi Glass Company Ltd., Tokyo, Japan

[21] Appl. No.: 09/078,483

[22] Filed: May 14, 1998

[30] Foreign Application Priority Data

May 16, 1997 [JP] Japan ..................... 9-127448

[51] Int. Cl.[7] ........................................... H01G 9/00
[52] U.S. Cl. ............................. 361/502; 361/505
[58] Field of Search .................... 361/502, 505, 361/523, 525; 204/192.15; 428/332, 436, 408; 352/500

[56] References Cited

U.S. PATENT DOCUMENTS

| | | | |
|---|---|---|---|
| 4,862,328 | 8/1989 | Morimoto et al. | 361/502 |
| 5,507,930 | 4/1996 | Yamashita et al. | 204/192.15 |
| 5,567,512 | 10/1996 | Chen et al. | 428/332 |

*Primary Examiner*—Kristine Kincaid
*Assistant Examiner*—Anthony Dinkins
*Attorney, Agent, or Firm*—Oblon, Spivak, McClelland, Maier & Neustadt, P.C.

[57] ABSTRACT

An electric double layer capacitor including an electrode containing carbon material as the main component, as a positive electrode and/or a negative electrode, and an electrolyte capable of forming an electric double layer at the interface with the electrode, wherein the carbon material is characterized in that in its Raman spectrum, the ratio of the peak intensity of G-band of an amorphous carbon component to the peak intensity of G-band of a graphite component is at least 0.7, and the ratio of the peak intensity of D-band of the graphite component to the peak intensity of G-band of the graphite component is at least 1.0.

19 Claims, No Drawings

ELECTRIC DOUBLE LAYER CAPACITOR, AND CARBON MATERIAL AND ELECTRODE THEREFOR

The present invention relates to an electric double layer capacitor having a high capacitance and excellent low temperature characteristics.

Electric double layer capacitors are available in the form of a coin type wherein an element having a separator sandwiched between a pair of polarizable electrodes which are made of activated carbon as the main component, is accommodated together with an electrolyte in a metal casing, which is sealed via an insulating gasket by a metal cover, or a rolled type wherein an element having a pair of polarizable electrode sheets which are rolled with a separator interposed therebetween, is accommodated together with an electrolyte in a metal casing, and an opening of the casing is sealed to prevent evaporation of the electrolyte from the opening.

Further, a stacked electric double layer capacitor has also been proposed for large current and large capacitance, wherein an element having many electrodes sheets stacked with a separator interposed therebetween, is incorporated (JP-A-4-154106, JP-A-3-203311, JP-A-4-286108). Namely, electrodes sheets molded in a rectangular shape are used as positive and negative electrodes, and they are alternately stacked with a separator interposed therebetween to form an element, which is accommodated in a casing in such a state that a positive lead member and a negative lead member are connected by caulking to the respective ends of the positive and negative electrodes. The element is impregnated with an electrolyte, and the casing is hermetically closed with a cover.

The capacitance per unit area of an electrode is influenced substantially by the physical properties of both the electrode constituting materials and the electrolyte. With respect to the electrolyte, various solvents, solutes, etc. have been studied. On the other hand, on the electrode side, an electrode containing activated carbon as the main component, is mainly employed, but the charge of the electric double layer formed on the surface of the activated carbon itself contributes to the capacitance of the electric double layer capacitor. Accordingly, it has been attempted to increase the capacitance of an electric double layer capacitor by increasing the specific surface area.

However, the specific surface area of activated carbon is at a level of 3,000 m$^2$/g at the maximum, and the capacitance per unit volume of an electric double layer capacitor using activated carbon having a large specific surface area, has already reached substantially the limit. Further, as the specific surface area increases, pores in the activated carbon tend to develop to reduce the electroconductive path in the activated carbon, whereby there has been a problem that the resistance of the activated carbon itself increases.

Further, the capacitance of an electric double layer stored at the mercury/water interface has been reported to be from 20 to 30 $\mu$F/cm$^2$, whereas the capacitance stored at the interface between the conventional activated carbon and the electrolyte used in an electric double layer capacitor, is at a level of about 5 $\mu$F/cm$^2$, which is a very small capacitance. With an electric double layer capacitor using such activated carbon as an electrode, the discharge capacity used to be not large enough even when the specific surface area of activated carbon was increased.

It is an object of the present invention to solve such problems of the prior art and to present an electric double layer capacitor having high capacitance and high reliability.

The present invention provides an electric double layer capacitor comprising an electrode containing carbon material as the main component, as a positive electrode and/or a negative electrode, and an electrolyte capable of forming an electric double layer at the interface with the electrode, wherein the carbon material is characterized in that in its Raman spectrum, the ratio of the peak intensity of G-band of an amorphous carbon component to the peak intensity of G-band of a graphite component is at least 0.7, and the ratio of the peak intensity of D-band of the graphite component to the peak intensity of G-band of the graphite component is at least 1.0.

Now, the present invention will be described in detail with reference to the preferred embodiments.

When the Raman spectrum of a carbon material is measured, two peaks are usually observed i.e. a peak in the vicinity of 1,600 cm$^{-1}$ showing G-band and a peak in the vicinity of 1,350 cm$^{-1}$ showing D-band. In the case of a carbon material which is used in the present invention, a graphite component and an amorphous carbon component are mixed, whereby the above-mentioned two peaks are two peaks on appearance which are formed by overlapping and combination of four peaks i.e. a peak of G-band of the graphite component, a peak of G-band of the amorphous carbon component, a peak of D-band of the graphite component and a peak of D-band of the amorphous carbon component.

The relation between the structure of the carbon material and the ratio (hereinafter referred to as $I_d/I_g$) of the intensity of D-band (hereinafter referred to as $I_d$) to the intensity of G-band (hereinafter referred to as $I_g$), is such that in the case of graphite crystal carbon, the smaller the crystal size, the larger the $I_d/I_g$, and in the case of amorphous carbon, the larger the size of clusters having a graphite structure and SP$^2$ bonds and the larger the proportion of carbon having SP$^2$ bonds, the larger the $I_d/I_g$. However, in the case of a carbon material in which the graphite component and the amorphous carbon component are present in a mixed state, it is difficult to simply relate the structure of the carbon material to the numerical value of $I_d/I_g$ i.e. the ratio in strength of the apparent two peaks in the Raman spectrum.

Therefore, the present inventors have subjected the Raman spectrum of activated carbon to curve fitting treatment by means of a gauss function to separate it into four peaks i.e. the peak (in the vicinity of 1,600 cm$^{-1}$) of G-band of the graphite component, the peak (in the vicinity of 1,550 cm$^{-1}$) of G-band of the amorphous carbon component, the peak (in the vicinity of 1,350 cm$^{-1}$) of D-band of the graphite component and the peak (in the vicinity of 1,250 cm$^{-1}$) of D-band of the amorphous carbon component, whereupon they have found the relation between the intensities of these four peaks and the capacitance per unit area of the activated carbon. The present invention has been accomplished on the basis of this discovery.

In general, the microstructure of activated carbon has a random layer structure in which graphite planes are laminated in parallel to one another to form small groups, and such small groups are randomly arranged and admixed with the amorphous component. When activated carbon is activated, pores will develop along the edge plane of highly reactive graphite and stop at the basal plane of the graphite. Accordingly, the basal plane of graphite appears on the majority of the activated carbon surface. On the other hand, it is reported that the double layer capacitances per unit area of the edge plane and the basal plane of graphite are from 50 to 70 $\mu$F/cm$^2$ and 3 $\mu$F/cm$^2$, respectively. The reason for such a large difference in capacitance is considered to be as follows.

In general, the capacitance (C) at the interface between solid and liquid is a combined capacitance consisting of the capacitance ($C_{sc}$) of a Helmholtz layer in the vicinity of the interface of the liquid represented by the formula (1) and the capacitance ($C_H$) of a space-charge layer in the vicinity of the solid. The relation between C and $C_{sc}$ and $C_H$ is represented by the formula (2). In the formula (1), $\epsilon$ is the dielectric constant of the liquid, $\epsilon_0$ is the dielectric constant of vacuum, $e_0$ is the charge of vacuum, $n_i$ is the carrier concentration, k is a Boltzmann's constant and T is the absolute temperature.

$$C_{sc}=(2\epsilon\epsilon_0 e_0^2 n_i/kT)^{1/2} \qquad (1)$$

$$1/C=1/C_{sc}+1/C_H \qquad (2)$$

As shown by the formula (1), the capacitance of the space-charge layer in the vicinity of the solid is proportional to a half power of the carrier concentration ($n_i$). Accordingly, in the case of an electroconductive material, $n_i$ is very large, $1/C_{sc}$ in the formula (2) is as small as negligible, but with a semiconductor, it can not be neglected. In the case of graphite, at the edge plane, the carrier concentration by high electrons is large, but at the basal plane, the carrier concentration is small so that $1/C_{sc}$ can not be neglected, and the combined capacitance (C) at the solid-liquid interface tends to be small.

Therefore, the present inventors have considered that to increase the carrier concentration in the interface direction so as to increase the capacitance per unit area of the carbon material, it may be effective to prevent the graphite planes from laminating in parallel to one another and to make the graphite structure orientation more random, so that edge planes will appear as much as possible in the activated carbon surface direction, and studies have been made on various carbon materials. And, it has been found that as the random alignment of the graphite structure advances, a carbon material having a high amorphous nature provides a high capacitance.

With the carbon material of the present invention, the peak in the vicinity of 1,600 cm$^{-1}$ and the peak in the vicinity of 1,350 cm$^{-1}$ in the Raman spectrum are subjected to curve fitting treatment by means of a gauss function to separate them into four peaks of the graphite component and the amorphous carbon component, whereby the ratio ($I_g(A)/I_g(G)$) of the peak intensity ($I_g(A)$) of G-band (in the vicinity of 1,550 cm$^{-1}$) of the amorphous carbon component to the peak intensity ($I_g(G)$) of G-band (in the vicinity of 1,600 cm$^{-1}$) of the graphite component is at least 0.7, thus indicating a high amorphous nature, and the ratio ($I_d(G)/I_g(G)$) of the peak intensity ($I_d(G)$) of D-band (in the vicinity of 1,350 cm$^{-1}$) of the graphite component to $I_g(G)$ is at least 1.0, thus indicating an advanced random orientation of the graphite component so that the carrier concentration in the interface direction is large, and there will be no substantial influence of the space-charge layer, so that the capacitance per unit area increases.

$I_g(A)/I_g(G)$ is preferably at least 1.0, more preferably at least 1.1. If $I_g(A)/I_g(G)$ is too large, the resistance of the carbon material tends to be large, and it is preferably at most 2.0.

$I_d(G)/I_g(G)$ is preferably at least 1.1, whereby the capacitance per unit area further increases. If $I_d(G)/I_g(G)$ is too large, the resistance of the carbon material tends to be large, and it is preferably at most 2.0.

In the present invention, the carbon material may, for example, be activated carbon or polyacene. In the case of activated carbon, activation treatment is carried out to increase the specific surface area, by using, as a starting material, a calcined product of a phenol resin, petroleum coke or a coconut shell, which is commonly used as the starting material for activated carbon. In order to obtain a particularly high amorphous nature, it is preferred to employ a carbon material obtained by activation treatment of petroleum coke as the starting material. The activation treatment may, for example, be steam activation, molten KOH activation or zinc chloride activation. However, activation treatment by molten KOH is preferred in order to make the structure of the carbon material random to obtain a large capacitance.

With respect to the conditions for the activation treatment by molten KOH, it is preferred to carry out the treatment at a temperature of from 500 to 1,000° C. for from 1 to 3 hours, and the amount of KOH is preferably at a level of from 100 to 500 wt %, based on the starting material of the carbon material.

As the specific surface area is increased by the activation treatment, the carbon material will have a higher capacitance, but the electroconductive path of the carbon material itself decreases, whereby the resistance will increase. With the same carbon material, the larger the specific surface area, the larger the capacitance. However, with the carbon material of the present invention, the capacitance per unit area is large, whereby a polarizable electrode having a high capacitance can be obtained even with a low specific surface area. Accordingly, in the present invention, the specific surface area of the carbon material is preferably from 500 to 1,500 m$^2$/g, more preferably from 700 to 1,100 m$^2$/g, so that the carbon material will have a low resistance and a high capacity.

The electrode of the present invention preferably contains a binder, and particularly preferably, it comprises the carbon material, an electroconductive material and a binder. Such an electrode is preferably obtained, for example, by kneading a powder of the carbon material, an electroconductive material and a binder such as polytetrafluoroethylene (hereinafter referred to as PTFE) in the presence of an alcohol, followed by molding into a sheet, which is, after being dried, bonded with a current collector by means of e.g. an electroconductive adhesive, to be integral with the current collector. Otherwise, the powder of the carbon material, the electroconductive material, the binder and a solvent may be mixed to obtain a slurry, which is then coated on a current collector made of a metal foil, followed by drying to obtain an electrode integrated with the current collector.

The electroconductive material may, for example, be a powder of carbon black, natural graphite, artificial graphite, titanium oxide or ruthenium oxide. Among them, it is preferred to employ ketjenblack or acetylene black as one of carbon blacks, since such a carbon black provides a large effect for improving the electroconductivity even with a small amount.

The blend proportion of the electroconductive material in the electrode is preferably at least 5 wt %, particularly preferably at least 10 wt %, in the total amount with the carbon material, in order to improve the electroconductivity of the electrode. However, if the blend proportion of the carbon material decreases, the capacitance of the electrode decreases. Therefore, the blend proportion of the conductive material in the electrode is preferably at most 40 wt %, particularly preferably at most 30 wt %.

The content of the binder in the electrode is preferably from 0.5 to 20 wt % in the total amount of the carbon material and the binder. If the amount of the binder is less than 0.5 wt %, the strength of the electrode tends to be inadequate, and if it exceeds 20 wt %, an increase in the resistance of the electrode or a decrease in the capacitance is likely to result. From the viewpoint of the balance of the capacitance and the strength, the blend proportion of the binder is more preferably from 0.5 to 10 wt %.

When the electrode is formed from a slurry, the binder to be mixed in the slurry may, for example, be PTFE, polyvinylidene fluoride, a fluoroolefin/vinyl ether copolymer, a crosslinked polymer, carboxymethyl cellulose, polyvinyl pyrrolidone, a polyvinyl alcohol or an acrylate polymer.

Further, when the binder is a crosslinked polymer, it is preferred to add a crosslinking agent, and as such a crosslinking agent, amines, polyamines, polyisocyanates, bisphenols or peroxides are preferred.

The solvent for the slurry is preferably one capable of dissolving the above binder, and N-methyl-2-pyrrolidone, dimethylformamide, toluene, xylene, isophorone, methyl ethyl ketone, ethyl acetate, methyl acetate, dimethyl phthalate, ethanol, methanol, butanol or water, may suitably be selected for use.

In the present invention, the above-described electrode may be used for both the positive and negative electrodes to prepare an electric double layer capacitor. However, only the negative electrode may be made of the above electrode, and as the positive electrode, an electrode containing a cell activated substance such as a metal oxide as the main component may be employed. Otherwise, only the positive electrode may be made of the above-described electrode, and as a negative electrode, a non-polarizable electrode containing lithium metal, a lithium alloy or a carbon material capable of reversibly occluding and releasing lithium ions, as the main component, may be used.

Among such electric double layer capacitors, an electric double layer capacitor using a carbon material capable of reversibly occluding and releasing lithium ions for the negative electrode and the above electrode for the positive electrode, is excellent in the charge and discharge cycle durability, makes it possible to increase the operation voltage and has a large capacitance, such being preferred.

The electrode containing a carbon material capable of occluding and releasing lithium ions as the main component, can be formed in the same manner as for the electrode containing the carbon material of the present invention as the main component. Namely, an alcohol is added to the binder and the powder of carbon material capable of occluding and releasing lithium ions, followed by kneading and molding the mixture into a sheet to obtain an electrode, which is then bonded to a current collector by means of e.g. an electroconductive adhesive. Otherwise, a solvent may be mixed to the binder and the powder of carbon material capable of occluding and releasing lithium ions to obtain a slurry, which is coated and processed in the same manner as for the electrode containing the carbon material of the present invention as the main component, to obtain an electrode integrated with the current collector.

Lithium ions are preliminarily occluded to the carbon material capable of occluding and releasing lithium ions. As such a method, the following method may, for example, be mentioned. Namely, there is a chemical method in which a lithium powder is preliminarily mixed with the carbon material capable of occluding lithium ions to prepare an electrode, which is then immersed in a non-aqueous electrolyte, or a lithium metal foil and a sheet electrode made of a binder and the carbon material capable of occluding lithium ions are immersed in a non-aqueous electrolyte in a contacted state, so that lithium is ionized and taken into the carbon material capable of occluding lithium ions.

Further, there is an electrochemical method wherein an electrode made of a binder and the carbon material capable of absorbing lithium ions, and an electrode made of a lithium metal, are immersed in an electrolyte of a non-aqueous solvent using a lithium salt as a solute, and an electric current is applied between the two, so that lithium is taken into the carbon material capable of occluding and releasing lithium ions, in an ionized state.

As the carbon material capable of occluding and releasing lithium ions, natural graphite, artificial graphite, graphitized mesocarbon particles, graphitized whiskers, vapor-phase grown graphitized carbon fibers, a calcined product of a furfuryl alcohol resin, or a calcined product of a novolak resin, may be preferably employed.

The natural graphite, the artificial graphite, the graphitized mesocarbon particles, the graphitized whiskers or the graphitized carbon fibers are preferably those having the crystal structures developed and having little impurities, wherein the spacing $D_{002}$ as measured by X-ray diffraction is at most 0.3360 nm, at most 0.3365 nm, at most 0.3370 nm, at most 0.3365 nm and at most 0.3365 nm, respectively, and the crystallite size $L_c$ is at least 150 nm, at least 50 nm, at least 20 nm, at least 10 nm and at least 10 nm, respectively.

The calcined product of the furfuryl alcohol resin is preferably one obtained by heat treating the furfuryl alcohol resin at a temperature of from 1,000 to 1,500° C. and having little impurities, wherein the spacing $d_{002}$ as measured by X-ray diffraction is from 0.375 to 0.390 nm.

The calcined product of the novolak resin is preferably the one obtained by heat treating a novolak resin at a temperature of at most 700° C. and having an atomic ratio of hydrogen/carbon of from 0.25 to 0.28 in the carbon material after the heat treatment, wherein the spacing $d_{002}$ as measured by X-ray diffraction is at least 0.380 nm. As such a carbon material capable of occluding and releasing lithium ions to be used for the negative electrode, it is preferred to employ a powder having an average particle size of at most 30 $\mu$m, whereby the capacitance can be made large, and the internal resistance can be reduced to a low level.

The current collector for the electrode of the present invention may be a conductive material which is electrochemically and chemically corrosion resistant. As a current collector for an electrode containing a carbon material as the main component, stainless steel, aluminum, titanium, tantalum or nickel may, for example, be used. Among them, stainless steel and aluminum are preferred current collectors from both aspects of performance and cost. As a current collector for an electrode containing a carbon material having lithium ions occluded therein, as the main component, stainless steel, copper or nickel may preferably be employed.

Further, the current collector may be in the form of a foil, or an expanded metal of nickel or aluminum having a three dimensional structure or a net or wool of stainless steel.

The electrolyte for the electric double layer capacitor for the present invention is not particularly limited, and a conventional known or well known electrolyte can be used, and a non-aqueous electrolyte wherein the solvent is a non-aqueous solvent, is preferred. An aqueous solution type electrolyte comprising an alkali metal or the like as a solute and sulfuric acid or the like as the solvent, has a decomposition voltage of 1.2 V. Whereas, a non-aqueous type electrolyte has a decomposition voltage of from 2 to 3 V. The storage energy of a capacitor is proportional to the electrostatic capacity of the capacitor and to a square of the applied voltage. Accordingly, it is advantageous to use a non-aqueous electrolyte having a high withstand voltage.

The solvent for the electrolyte is preferably at least one solvent selected from electrochemically stable propylene carbonate, ethylene carbonate, γ-butyrolactone, sulfolane, 3-methylsulfolane, 1,2-dimethoxyethane, acetonitrile, dimethylformamide, diethylcarbonate, ethyl methyl carbonate and dimethylcarbonate.

When the electrode having the above-mentioned specific Raman spectrum is used for both the positive and negative electrodes, the solute for the electrolyte is preferably at least one member selected from the group consisting of $R^1R^2R^3R^4PBF_4$, $R^1R^2R^3R^4NBF_4$, $R^1R^2R^3R^4PPF_6$ and $R^1R^2R^3R^4NPF_6$, wherein each of $R^1$ to $R^4$ which may be the same or different, is a $C_{1-5}$ alkyl group. Particularly preferred is $(C_2H_5)_4NBF_4$, $(C_2H_5)_3(CH_3)NBF_4$, $(C_2H_5)_4PBF_4$ or $(C_2H_5)_3(CH_3)PBF_4$.

When the electrode containing, as the main component, the carbon material capable of occluding and releasing lithium, is used as the negative electrode, a lithium salt is preferred as an electrolyte. Specifically, $LiClO_4$, $LiCF_3SO_3$, $LiBF_4$, $LiPF_6$, $LiAsF_6$, $LiSbF_6$, $LiCF_3CO_2$ or $LiN(CF_3SO_2)_2$ may be mentioned, and particularly preferred is $LiClO_4$ or $LiPF_6$. In the present invention, as a separator to be inserted between the positive electrode and the negative electrode, a non-woven fabric of polypropylene fibers or a non-woven fabric of glass fibers, may, for example, be suitably used.

The electric double layer capacitor of the present invention may have a construction of either a coin type wherein a pair of sheet electrodes having a separator interposed therebetween are accommodated together with an electrolyte in a metal casing, or a rolled type wherein a pair of the positive and negative electrodes are rolled with a separator interposed therebetween, or a stacked type wherein many electrodes are stacked with a separator interposed therebetween.

Now, the present invention will be described in further detail with reference to Examples (Examples 1 to 5) and Comparative Examples (Examples 6 to 8). However, it should be understood that the present invention is by no means restricted by such specific Examples. The physical properties of the carbon materials used for the electrodes of the electric double layer capacitors in Examples 1 to 8, and the peak intensity ratios $(I_g(A)/I_g(G))$ and $(I_d(G)/I_g(G))$ obtained from the Raman spectra, are shown in Table 1. In Table 1, the capacitance represents the capacitance per unit area of the carbon material.

Further, the Raman spectrum was measured by using an argon ion laser having a wavelength of 514.5 nm as an exciting beam and CCD (Charge Coupled Device)) as a detector. The laser power was set to be not higher than 5 mW, so that the carbon material would not undergo a structural change during the measurement by the heat of the laser beam.

EXAMPLE 1

While adding ethanol, a mixture comprising 80 wt % of a powder of petroleum coke type carbon material activated by molten KOH (specific surface area: 1,000 m²/g), 10 wt % of ketjenblack EC and 10 wt % of PTFE, was kneaded and formed by rolling into an electrode sheet having a width of 10 cm, a length of 10 cm and a thickness of 0.65 mm, which was dried at 200° C. for 2 hours. From this sheet, two electrode sheets having a diameter of 12 mm were punched out, and they were bonded by means of a graphite type electroconductive adhesive to a stainless steel 316 casing and a cover, respectively.

The cover and the casing were vacuum-dried at 300° C. for 4 hours, and then, a propylene carbonate solution containing 1 mol/lit. of $(C_2H_5)_4NBF_4$ was impregnated to the electrodes in a dry argon atmosphere. Then, the two electrode sheets were disposed to face each other with a non-woven fabric separator made of polypropylene interposed therebetween, and caulked and sealed by means of an insulating gasket made of polypropylene to obtain a coin type electric double layer capacitor having a diameter of 18.3 mm and a thickness of 2.0 mm.

EXAMPLE 2

A coin type electric double layer capacitor was prepared in the same manner as in Example 1 except that a powder of petroleum coke type carbon material activated by molten KOH (specific surface area: 800 m²/g) was used as the carbon material, and $(C_2H_5)_3(CH_3)NBF_4$ was used instead of $(C_2H_5)_4NBF_4$.

EXAMPLE 3

A coin type electric double layer capacitor was prepared in the same manner as in Example 1 except that a powder of petroleum coke type carbon material activated by molten KOH (specific surface area: 1,400 m²/g) was used as the carbon material, and a mixed solution of sulfolane and ethyl methyl carbonate (70:30 by weight ratio) containing 1.5 mol/lit. of $(C_2H_5)_3(CH_3)NBF_4$ was used instead of the propylene carbonate solution containing 1 mol/lit of $(C_2H_5)_4NBF_4$.

EXAMPLE 4

A coin type electric double layer capacitor was prepared in the same manner as in Example 1 except that a steam-activated powder of petroleum type carbon material (specific surface area: 1,250 m²/g) was used as the carbon material.

EXAMPLE 5

One electrode sheet was prepared in the same manner as in Example 1 and bonded to a stainless steel 3316 casing by means of a graphite type electroconductive adhesive. Then, three times by weight of N-methyl-2-pyrrolidone was added to a mixture comprising 90 wt % of a natural graphite powder capable of occluding and releasing lithium (purity: 99.3%, spacing $d_{002}$ of graphite crystal=0.3355 nm, size $L_c$ of crystallite=at least 200 nm, average particle size: 10 μm) and 10 wt % of polyvinylidene fluoride, and the mixture was stirred and mixed by applying ultrasonic waves to obtain a slurry of natural graphite having polyvinylidene fluoride dissolved therein. This slurry was coated on a stainless steel 316 cover and dried at 190° C. for 1 hour to form a coating film having a diameter of 12.5 mm and a thickness of 0.1 mm. This cover and the casing were vacuum-dried at 200° C. for 4 hours, and then a lithium metal foil having a diameter of 8 mm and a thickness of 0.02 mm was press-bonded on the coating film of the cover in a dry argon atmosphere, and an ethylene carbonate solution containing $LiPF_6$ at a concentration of 1.0 mol/lit., was impregnated to the electrodes. Then, in the same manner as in Example 1, a coin type electric double layer capacitor was assembled. Further, this coin type electric double layer capacitor was left to stand in a constant temperature tank at 70° C. for 16 hours. By this operation, the metal lithium which was in contact with the natural graphite coated on the cover would be electrically taken into the natural graphite in the ionized state. In such a manner, a coin type electric double layer capacitor having lithium ions occluded in the negative electrode, was prepared.

EXAMPLE 6

A coin type electric double layer capacitor was prepared in the same manner as in Example 1 except that a powder of phenol type carbon activated by molten KOH (specific surface area: 1,000 m$^2$/g) was used as the carbon material.

EXAMPLE 7

A coin type electric double layer capacitor was prepared in the same manner as in Example 3 except that a steam-activated carbon material of coconut shell type (specific surface area: 1,500 m$^2$/g) was used as the carbon material.

EXAMPLE 8

A coin type electric double layer capacitor having lithium ions occluded in the negative electrode, was prepared in the same manner as in Example 5 except that a steam-activated carbon powder of coconut shell type (specific surface area: 1,800 m$^2$/g) was used as the carbon material.

By applying a voltage of 2.5V to the electric double layer capacitors of Examples 1 to 4 and Examples 6 and 7 and a voltage of 3.3 V to the lithium ion-doped type electric double layer capacitors of Examples 5 and 8, the respective initial capacitances and internal resistances were measured. Further, the changes in the capacitances after maintaining them at 70° C. for 1,000 hours were measured. The results are shown in Table 2.

As is evident from the Table, according to the present invention, it is possible to obtain an electric double layer capacitor having a large capacitance, a low resistance and little change in the capacitance, as compared with Comparative Examples.

TABLE 1

|  | Specific surface area | $I_g(A)/I_g(G)$ | $I_d(G)/I_g(G)$ | Capacitance ($\mu F/m^2$) |
| --- | --- | --- | --- | --- |
| Example 1 | 1,000 | 1.17 | 1.04 | 15.1 |
| Example 2 | 800 | 1.22 | 1.21 | 16.6 |
| Example 3 | 1,400 | 1.21 | 1.02 | 14.5 |
| Example 4 | 1,250 | 0.79 | 1.01 | 11.9 |
| Example 5 | 1,000 | 1.17 | 1.04 | 15.9 |
| Example 6 | 1,000 | 0.39 | 0.89 | 6.1 |
| Example 7 | 1,500 | 0.41 | 0.98 | 5.8 |
| Example 8 | 1,800 | 0.50 | 0.86 | 5.1 |

TABLE 2

|  | Applied voltage | Initial capacitance | Initial internal resistance | Change in capacitance |
| --- | --- | --- | --- | --- |
| Example 1 | 2.5V | 3.72 F | 8.4Ω | −10.6% |
| Example 2 | 2.5V | 3.58 F | 7.8Ω | −9.8% |
| Example 3 | 2.5V | 3.79 F | 9.2Ω | −11.2% |
| Example 4 | 2.5V | 3.46 F | 9.3Ω | −17.3% |
| Example 5 | 3.3V | 3.96 F | 28.3Ω | −18.3% |
| Example 6 | 2.5V | 2.09 F | 9.0Ω | −27.8% |
| Example 7 | 2.5V | 2.42 F | 8.9Ω | −29.6% |
| Example 8 | 3.3V | 2.77 F | 16.3Ω | −24.7% |

According to the present invention, it is possible to obtain a highly reliable electric double layer capacitor having a large capacitance, a low resistance and little deterioration in capacitance even when maintained at a high temperature for a long period of time.

What is claimed is:

1. An electric double layer capacitor comprising an electrode containing carbon material as a main component, as a positive electrode and/or a negative electrode, and an electrolyte capable of forming an electric double layer at the interface with the electrode, wherein the carbon material is characterized in that in its Raman spectrum, a ratio of a peak intensity of G-band of an amorphous carbon component to a peak intensity of G-band of a graphite component is at least 0.7, and a ratio of a peak intensity of D-band of the graphite component to the peak intensity of G-band of the graphite component is at least 1.0.

2. The electric double layer capacitor according to claim 1, wherein the carbon material is characterized in that in its Raman spectrum, the ratio of the peak intensity of G-band of the amorphous carbon component to the peak intensity of G-band of the graphite component is at least 1.0.

3. The electric double layer capacitor according to claim 1, wherein the carbon material is activated carbon obtained by carbonizing petroleum coke by heat treatment, followed by activation with molten KOH.

4. The electric double layer capacitor according to claim 1, wherein the carbon material has a specific surface area of from 500 to 1,500 m$^2$/g as measured by a nitrogen adsorption method.

5. The electric double layer capacitor according to claim 1, wherein the electrode comprises said carbon material, an electroconductive material and a binder.

6. The electric double layer capacitor according to claim 5, wherein the binder is contained in an amount of from 0.5 to 20 wt % in the total amount of said carbon material and the binder in the electrode.

7. The electric double layer capacitor according to claim 5, wherein the binder is polytetrafluoroethylene.

8. The electric double layer capacitor according to claim 1, wherein a solvent for the electrolyte is an organic solvent.

9. The electric double layer capacitor according to claim 1, comprising both positive and negative electrodes containing said carbon material as the main component.

10. The electric double layer capacitor according to claim 9, wherein a solute of the electrolyte is at least one member selected from the group consisting of $R^1R^2R^3R^4PBF_4$, $R^1R^2R^3R^4NBF_4$, $R^1R^2R^3R^4PPF_6$ and $R^1R^2R^3R^4NPF_6$, wherein each of $R^1$ to $R^4$ which may be the same or different, is a $C_{1-5}$ alkyl group.

11. The electric double layer capacitor according to claim 9, wherein a solute of the electrolyte is $(C_2H_5)_4NBF_4$, $(C_2H_5)_3(CH_3)NBF_4$, $(C_2H_5)_4PBF_4$ or $(C_2H_5)_3(CH_3)PBF_4$.

12. The electric double layer capacitor according to claim 1, wherein the negative electrode contains, as the main component, a carbon material capable of occluding and releasing lithium.

13. The electric double layer capacitor according to claim 12, wherein a solute of the electrolyte is a lithium salt.

14. A carbon material for an electrode for an electric double layer capacitor, characterized in that in its Raman spectrum, a ratio of a peak intensity of G-band of an amorphous carbon component to the peak intensity of G-band of a graphite component is at least 0.7, and a ratio of a peak intensity of D-band of the graphite component to the peak intensity of G-band of the graphite component is at least 1.0.

15. The carbon material for an electrode for an electric double layer capacitor according to claim 14, characterized in that in its Raman spectrum, the ratio of the peak intensity of G-band of the amorphous carbon component to the peak intensity of G-band of the graphite component is at least 1.0.

16. The carbon material for an electrode for an electric double layer capacitor according to claim 14, which is obtained by carbonizing petroleum coke by heat treatment, followed by activation with molten KOH.

17. An electrode for an electric double layer capacitor, which comprises a carbon material and a binder, wherein the carbon material is characterized in that in its Raman spectrum, a ratio of a peak intensity of G-band of an amorphous carbon component to a peak intensity of G-band of a graphite component is at least 0.7, and a ratio of a peak intensity of D-band of the graphite component to the peak intensity of G-band of the graphite component is at least 1.0.

18. The electrode for an electric double layer capacitor according to claim 17, wherein the carbon material is characterized in that in its Raman spectrum, the ratio of the peak intensity of G-band of the amorphous carbon component to the peak intensity of G-band of the graphite component is at least 1.0.

19. The electrode for an electric double layer capacitor according to claim 17, wherein the binder is polytetrafluoroethylene.

* * * * *